June 17, 1930.  L. B. KAPP  1,764,727
LUBRICATION OF BEARINGS
Filed Sept. 24, 1923   2 Sheets-Sheet 1

INVENTOR
LEONARD B. KAPP
BY Roy M. Eilers
ATTORNEY

Patented June 17, 1930

1,764,727

UNITED STATES PATENT OFFICE

LEONARD B. KAPP, OF BELOIT, WISCONSIN, ASSIGNOR TO FAIRBANKS, MORSE & CO., OF CHICAGO, ILLINOIS, A CORPORATION OF ILLINOIS

LUBRICATION OF BEARINGS

Application filed September 24, 1923. Serial No. 664,512.

My invention relates to improvements in the lubrication of bearings, and more particularly to improvements in the lubrication of end bearings in internal combustion engines employing crank case compression, and has among its objects the providing of a means for drawing or reclaiming the oil from the end or other bearings back into the crank case or similar chamber when it may be used again.

Heretofore in internal combustion engines of the two-cycle type, it has been customary to allow the oil from the main bearings to drain away, thereby losing this oil. By means of my invention, however, it is possible, not only to reclaim this oil by drawing it back into the crank case, but it is also possible to maintain a greater flow of oil through the bearing, thereby keeping it much cooler than heretofore and insuring a longer life for the bearing. This is accomplished by making use of the periodically varying compression existing in the crank case. This will be understood from the following description and drawings of my invention. It will be understood that while I describe and illustrate a preferred form of my invention, there are numerous forms and variations in which my invention may be used by those skilled in the art, and I do not limit myself to the particular forms which I will describe and illustrate.

Figure 1:
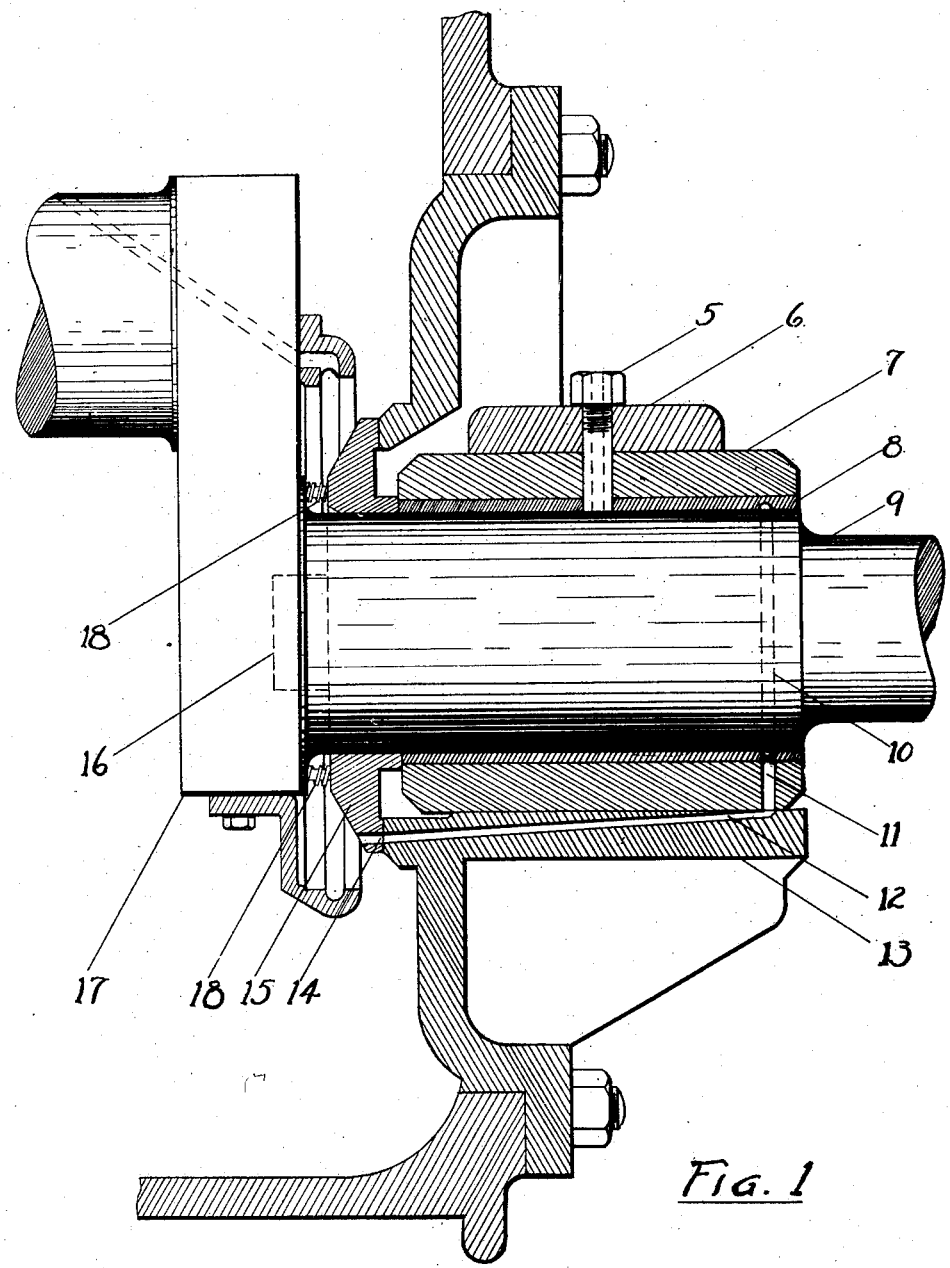
Figure 2:
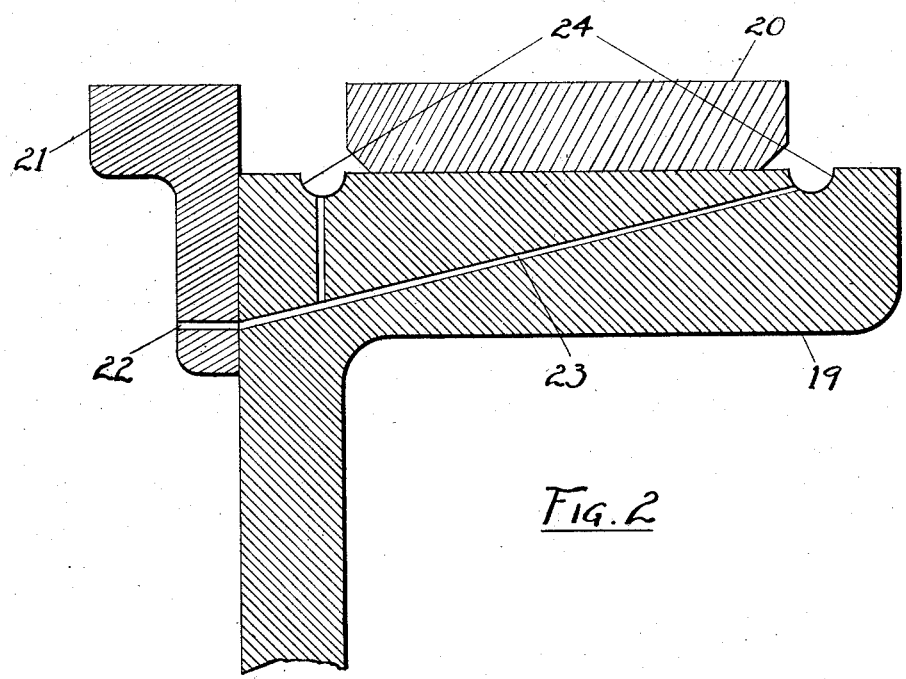

In the drawings Fig. 1 is a sectional view of a crank case fragment and end bearing embodying a form of my invention, and Fig. 2 is a sectional view of a modified form of my invention.

In Fig. 1 the end of the tube, not shown, from the standard force feed lubricator (not shown) is screwed into the main bearing oil tube at 5 which latter, in turn, is screwed into the main bearing cap 6. This oil tube, 5, projects through the main bearing bushing 7. Channels or grooves of any usual form in the Babbitt liner, 8, distribute the lubricating oil over the journal of the crank shaft, 9. A groove, 10, is cut in the Babbitt liner,8, around the journal preferably near the outer end of the bearing. A hole 11, is drilled in the main bearing bushing, 7, to meet the groove, 10. A conduit, 12, in the main bearing bushing, 7, is in communication with the hole, 11. A passage, 14, is in the air stop ring, 15. Lugs, 16, on the air-stop ring, slip over the crank cheek, 17, and cause the air-stop ring to rotate with the crank shaft. The passage, 14, will register with the conduit, 12, once during each revolution of the crank shaft. Springs, 18, are inserted over dowels placed in the air-stop ring and are located between this ring and the crank cheek, forcing the air-stop ring against the main bearing body, which, thus in effect, forms a part of the crank case. By means of this arrangement, therefore, the crank case is fairly well sealed where the crank shaft passes through, a necessity in engines of this type employing crank case compression.

By proper adjustment the passage, 14, is made to register with the conduit, 12, at a time when the pressure in the crank case is preferably near its minimum, which occurs periodically during the revolution of the crankshaft. During the time that the passage, 14, registers with the conduit, 12, oil will be transferred from the main bearing to the inside of the crank case, on account of the difference in pressure between the inside of the crank case and the conduit. During the rest of the cycle no oil will be transferred as the conduit 12, will be closed by the air-stop ring.

In Fig. 2 I show a modified construction. This drawing shows the main bearing body, 19, made large enough so that the grooves, 24, may be cut under each end of the main-bearing bushing 20. These grooves communicate with a conduit, 23, in the main bearing body, 19. A passage, 22, in the air-stop ring, 21, registers with the conduit, 23, once during each revolution of the crank shaft. It is evident that in this construction whatever oil drains out of the ends of the bearing will collect in the grooves 24.

My invention is applicable to bearings and other parts requiring lubrication and is equally effective with forced feed, gravity or other forms of lubrication, and is also applicable to any type of engine employing crank case compression, either stationary or rotary. When the crank case compression falls below the pressure in the lubricating conduit or system, the communication is then established and the oil is drawn or forced into the crank case. The greater the difference in the pressures, the more effective the action.

I claim:

1. In an engine, a crank case adapted to be subjected to periodic variations of pressure, a crank shaft in said case, a bearing for said shaft, and a rotary valve member yieldingly disposed against said bearing and a wall of said crank-case and serving as an air stop plate therefor, an oil collecting conduit extending from the shaft bearing to the valve member, there being a passage through said member, terminating in the crank-chamber, for establishing a periodic communication of said conduit with said chamber.

2. In combination with a crank case in which there exists a periodically varying pressure, an oil channel outside of said crank case, a crank shaft, a bearing therefor, in oil communicating relation to said channel, and an air stop plate detachably carried by said crank shaft within said crank case, said plate having an oil delivery passage therethrough, opening into the interior of the crank case, and disposed remotely from the crank, said passage being adapted for the periodic communication of said channel with the interior of said crank case, and means for yieldingly positioning said plate adjacent a terminus of said oil channel.

3. In combination with a crank case in which there exists a periodically varying pressure, an oil conduit outside of said crank case, a crank shaft, a bearing therefor in oil transferring relation with said conduit, and a combined air- and oil-stop ring external to and separable from said crank shaft, and having a fluid opening therethrough, disposed opposite the crank, said opening constituting a terminus for said conduit, opening into the interior of the crank case.

4. In combination with a crank case in which there exists a periodically varying pressure, a lubricated bearing associated with the crank case, an oil conduit outside of said crank case, and communicating with said bearing, a port in the crank case, adapted for access to the bearing, a crank shaft, and a combined air-stop plate and rotary oil-valve member mounted on said crank shaft and adapted to seal said port, said member having a single fluid opening therethrough, disposed opposite the crank and adapted to register with said conduit to establish a periodical communication of said conduit with said crank case when said crank case pressure is less than the pressure in said conduit.

5. A member comprising a crank case adapted to hold a periodically varying compression and having a passage thereinto, a member having an oil passage therein, one of said members being movable relative to the other, whereby said passages are made to periodically register to permit a flow of oil from one to the other, responsive to variations in crank case compression, and into the interior of said crank case; and resilient means adapted to maintain a sealing contact between said members.

6. A crank case arranged for substantial pressure pulsations and having an opening therein, a crank shaft projecting through said crank case, a bearing for said crank shaft, an annular air-stop collar detachably carried by said crank shaft and covering said opening, and having an opening therethrough, directed to the interior of the crank case, and adapted to effect a periodic delivery of oil thereto, a member external to said crank case having an oil passageway therein communicating with the crank shaft bearing, said passageway being adapted to register periodically with the opening in the annular collar, for communication with said crank case.

7. A crank case in which there exists alternations of suction and pressure, a crank shaft, a bearing for said crank shaft external to said crank case, the crank case having an opening for access to the bearing, an oil conduit from said bearing to the interior of said crank case, and a perforated disc within said crank case and operated by said crank shaft for closing said conduit for a predetermined interval during the period of pressure in said crank case and for opening said conduit for a predetermined interval during the period of suction in said crank case, said disc being adapted to serve as a closure for said opening.

8. A crank case in which there exists alternations of suction and pressure, a crank shaft, a bearing for said crank shaft external to said crank case, the crank case having an opening therein for access to the bearing, an oil drain from said bearing to the interior of said crank case, and a spring pressed air stop ring rotating with said crank shaft, and serving as a closure for said crank case opening, and arranged for closing said oil drain during the period of pressure in said crank case and for opening said oil drain for a predetermined interval during the period of suction in said crank case.

LEONARD B. KAPP.